US012580832B2

(12) United States Patent
Petla et al.

(10) Patent No.: US 12,580,832 B2
(45) Date of Patent: Mar. 17, 2026

(54) DETECTING DEVICE CHANGE DUE TO DHCP IN SPARSELY POPULATED LOG DATA

(71) Applicant: Zscaler, Inc., San Jose, CA (US)

(72) Inventors: Sai Kishore Petla, Leander, TX (US); Thomas James Geisler, Fort Myers, FL (US); Scott Andrew Hankins, Cupertino, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 18/636,209

(22) Filed: Apr. 15, 2024

(65) Prior Publication Data

US 2024/0388514 A1     Nov. 21, 2024

Related U.S. Application Data

(60) Provisional application No. 63/502,763, filed on May 17, 2023.

(51) Int. Cl.
H04L 43/067 (2022.01)
H04L 43/062 (2022.01)

(52) U.S. Cl.
CPC .......... H04L 43/067 (2013.01); H04L 43/062 (2013.01)

(58) Field of Classification Search
CPC ............................ H04L 43/067; H04L 43/062
See application file for complete search history.

(56) References Cited

U.S. PATENT DOCUMENTS

| | | | |
|---|---|---|---|
| 5,805,733 A | * | 9/1998 | Wang ..................... G06V 20/40 |
| | | | 382/232 |
| 7,957,319 B2 | | 6/2011 | Deshpande et al. |
| 9,118,495 B1 | | 8/2015 | Hankins et al. |
| 10,187,353 B2 | | 1/2019 | Muppala et al. |
| 10,263,868 B1 | * | 4/2019 | Baldi .................... H04W 12/02 |
| 10,389,583 B2 | | 8/2019 | Hankins et al. |
| 10,764,110 B2 | | 9/2020 | Hankins et al. |
| 10,819,569 B2 | | 10/2020 | Hankins et al. |
| 10,880,162 B1 | | 12/2020 | Hankins et al. |
| 11,178,184 B2 | | 11/2021 | Hankins et al. |
| 11,184,230 B2 | | 11/2021 | Hankins et al. |
| 11,212,183 B1 | | 12/2021 | Hankins et al. |
| 11,424,995 B1 | | 8/2022 | Cartsonis et al. |
| 2019/0173735 A1 | * | 6/2019 | Wiacek ................ H04L 67/535 |
| 2022/0109685 A1 | | 4/2022 | Hankins et al. |

* cited by examiner

*Primary Examiner* — Kamal M Hossain
(74) *Attorney, Agent, or Firm* — Baratta Law PLLC; Lawrence A. Baratta, Jr.

(57) ABSTRACT

Systems and methods for detecting device change due to Dynamic Host Configuration Protocol (DHCP) in sparsely populated log data include monitoring and logging network traffic data; identifying one or more outlier time gaps associated with an Internet Protocol (IP) address used to communicate over the network within the logged network traffic data; and determining the occurrence of a DHCP change based on one or more network traffic characteristics of the IP address before and after the outlier time gap.

20 Claims, 9 Drawing Sheets

650

LOG ENTRIES FOR IP ADDRESS X.X.X.X

TIME

650

DETECTING DEVICE CHANGE DUE TO DHCP IN SPARSELY POPULATED LOG DATA

FIELD OF THE DISCLOSURE

The present disclosure relates generally to networking and computing. More particularly, the present disclosure relates to systems and methods for detecting device change due to Dynamic Host Configuration Protocol (DHCP) in sparsely populated log data.

BACKGROUND OF THE DISCLOSURE

Devices on a network are given Internet Protocol (IP) addresses via DHCP. As described herein, a device can be any electronic device having network access, including, e.g., laptop computers, desktop computers, mobile phones, tablets, media streaming devices, printers, servers, storage devices, Internet-of-Things (IoT) devices, and the like. Generally, the devices can be segmented into mobile and fixed devices. For example, in an enterprise network, a server can be viewed as fixed, namely always residing on the network, whereas a mobile device can come and go based on the associated user being at work (on the enterprise network) or remote. That said, the traditional view of an enterprise network (i.e., corporate, private, industrial, operational, etc.) previously included a well-defined perimeter defended by various appliances (e.g., firewalls, intrusion prevention, advanced threat detection, etc.). However, this is no longer the case—the definition of the workplace, namely the enterprise network, is no longer confined to within the well-defined perimeter, and with applications moving to the cloud, the perimeter has extended to the Internet. This results in increased risk. As such, cloud-based security solutions have emerged, such as Zscaler Internet Access (ZIA) and Zscaler Private Access (ZPA), available from Zscaler, Inc., the applicant and assignee of the present application.

One such aspect of the cloud-based security solutions is logging device activity. One aspect of logging is to uniquely identify the devices, such as via IP addresses. However, with DHCP and with mobile devices, there is a question as to whether a given IP address over time belongs to the same device (or device type). For example, a mobile device may be assigned a given IP address and after the user leaves the network, this same IP address may be assigned to a different device.

BRIEF SUMMARY OF THE DISCLOSURE

The present disclosure relates to systems and methods for detecting device change due to Dynamic Host Configuration Protocol (DHCP) in sparsely populated log data. In an embodiment, the present disclosure includes a method with steps, a cloud-based system configured to implement the steps, and a non-transitory computer-readable medium storing computer-executable instructions for causing performance of the steps. The steps include monitoring and logging network traffic data; identifying one or more outlier time gaps associated with an Internet Protocol (IP) address used to communicate over the network within the logged network traffic data; and determining the occurrence of a Dynamic Host Configuration Protocol (DHCP) change based on one or more network traffic characteristics of the IP address before and after the outlier time gap.

The steps can further include wherein the one or more outlier time gaps are determined based on a time gap being greater than or equal to a significant time gap value. The one or more outlier time gaps can be determined based on a time gap being greater than or equal to an average time gap in the logged network traffic plus three standard deviations. The one or more network traffic characteristics can include a similarity of hostnames and user agents associated with the IP address from before and after the outlier time gap. The steps can further include performing a similarity calculation based on a plurality of hostnames and user agents associated with the IP address from before and after the outlier time gap. The steps can further include responsive to a similarity score of the similarity calculation being below a threshold, determining the occurrence of a DHCP change. The one or more network traffic characteristics can include a device type associated with the IP address from before and after the outlier time gap. The steps can further include extracting a device type from user agent text associated with the IP address from before and after the outlier time gap. The steps can further include responsive to identifying a device type change, determining the occurrence of a DHCP change. The steps can further include marking the network traffic data based on the determining.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

Again, the present disclosure relates to systems and methods for detecting device change due to Dynamic Host Configuration Protocol (DHCP) in sparsely populated log data. That is, the present disclosure provides an approach to determine in a log if a given device, e.g., user device, server/Internet of Things (IoT) device, identified by an IP address is still the same device after a gap in log activity. The present disclosure is for use with the above-referenced cloud-based security solutions, as well as other services, devices, etc., for purposes of identifying whether log entries belong to a same device and/or its device type. In the past, this was performed based on an associated Media Access Control (MAC) address. However, efforts are underway to anonymize and randomize the MAC address specifically to prevent tracking. Further, the MAC address may not be available, such as in a cloud-based system. The present disclosure operates on IP addresses which are transient in nature, changing over time based on DHCP, especially for mobile devices. Even further, sparsely populated log data may not have a lot of data, having many empty records.

Example Cloud-Based System Architecture

Figure 1A:
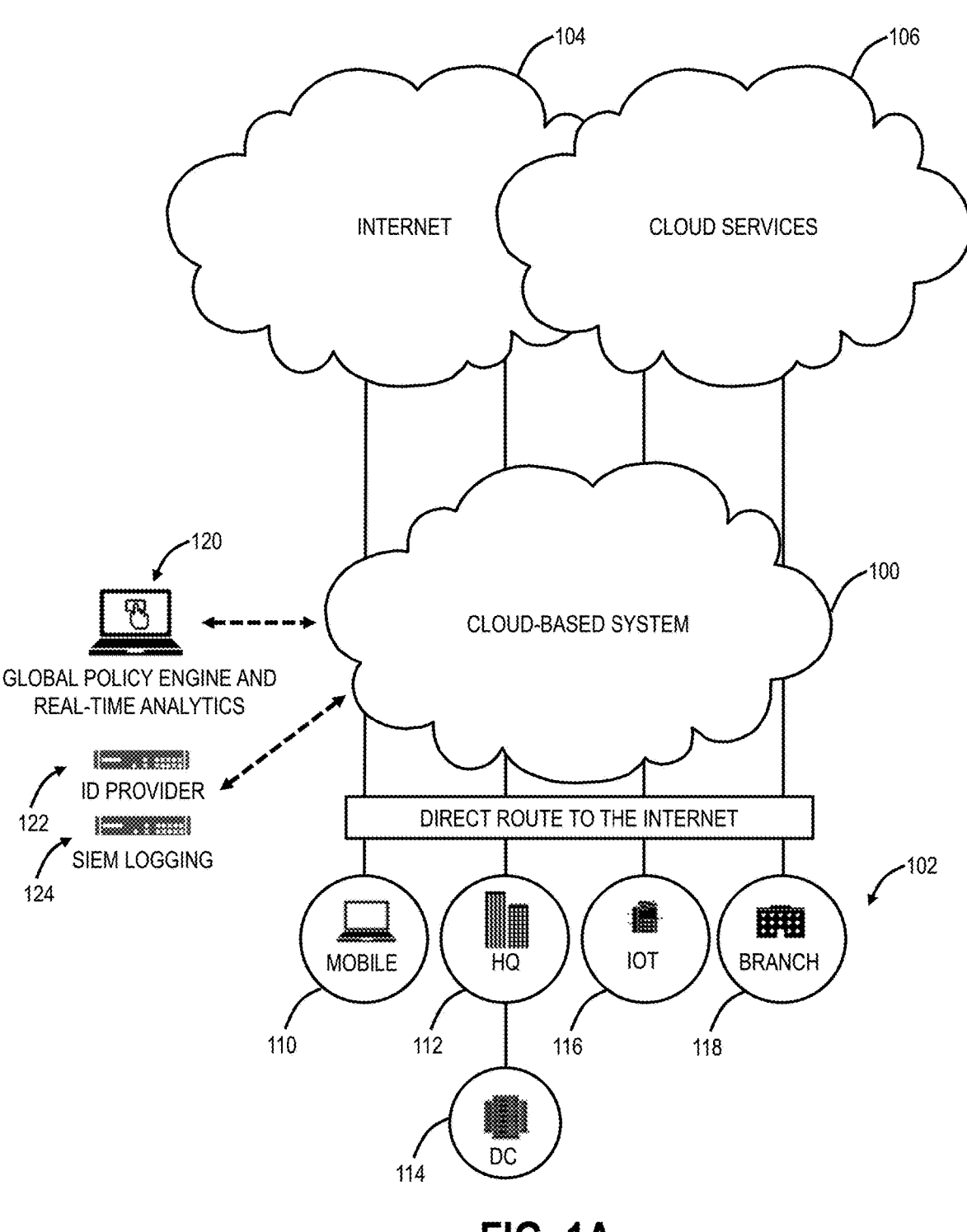
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
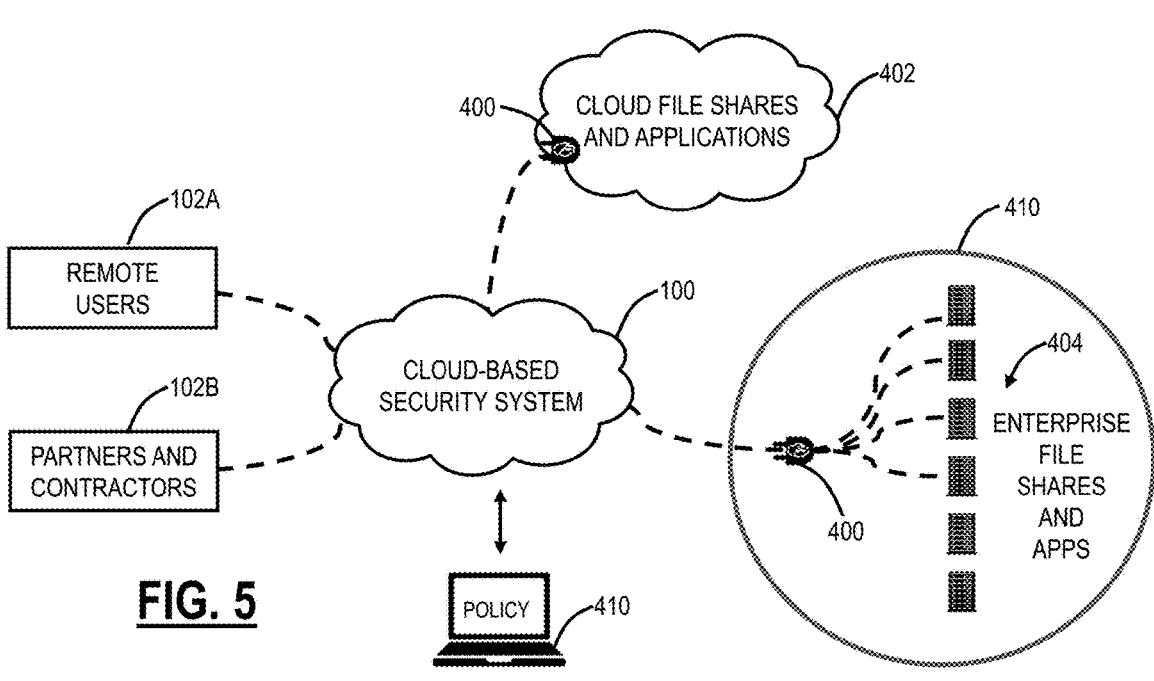
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
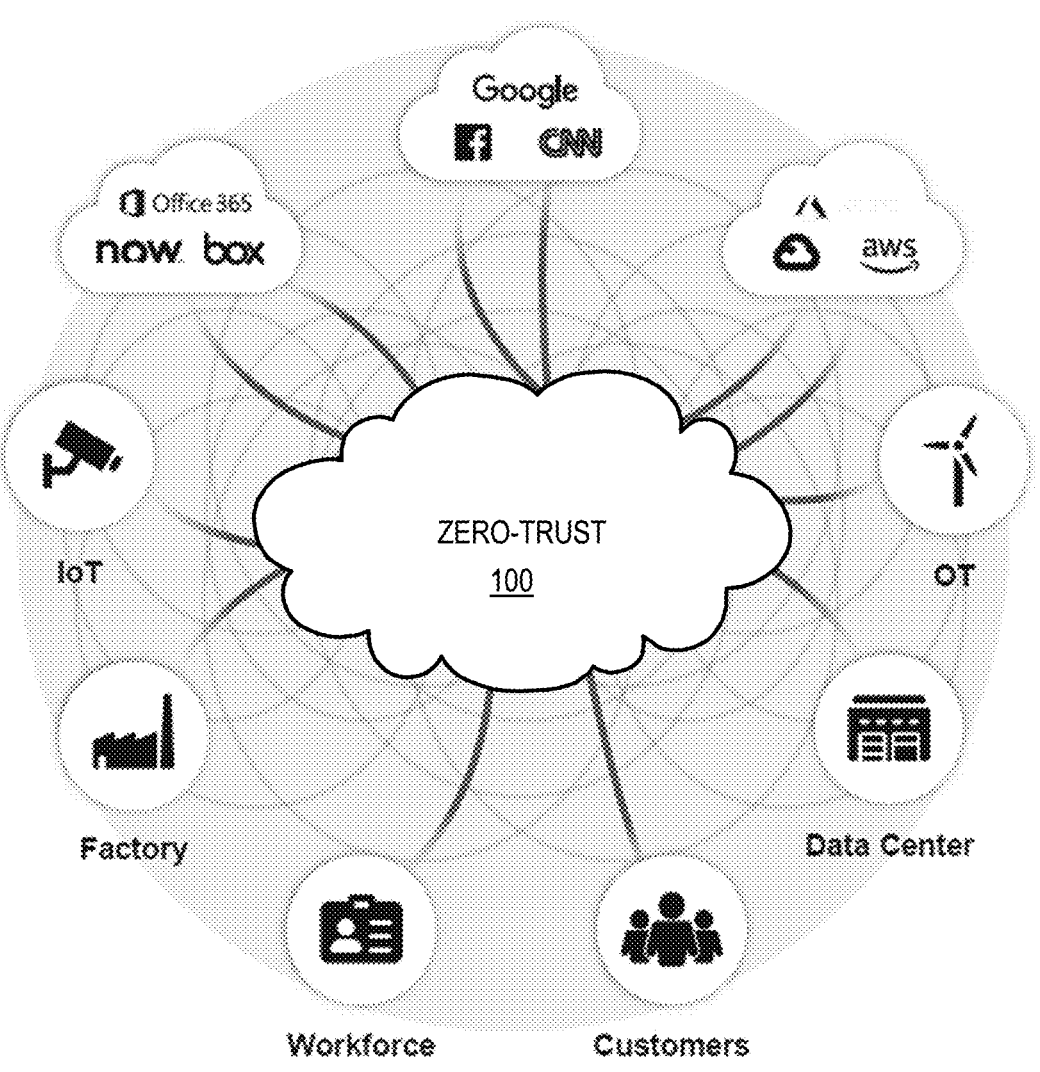
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
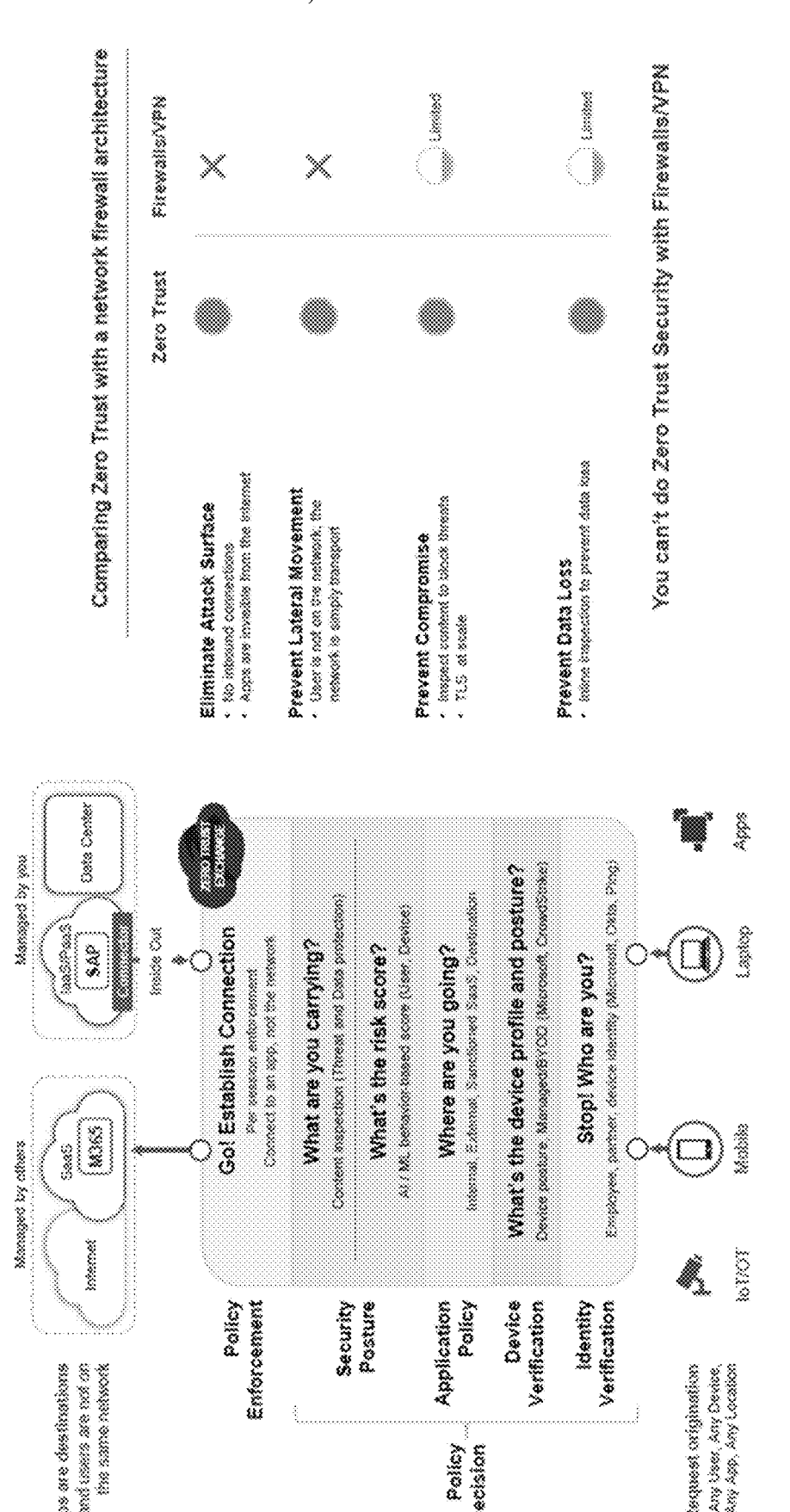
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
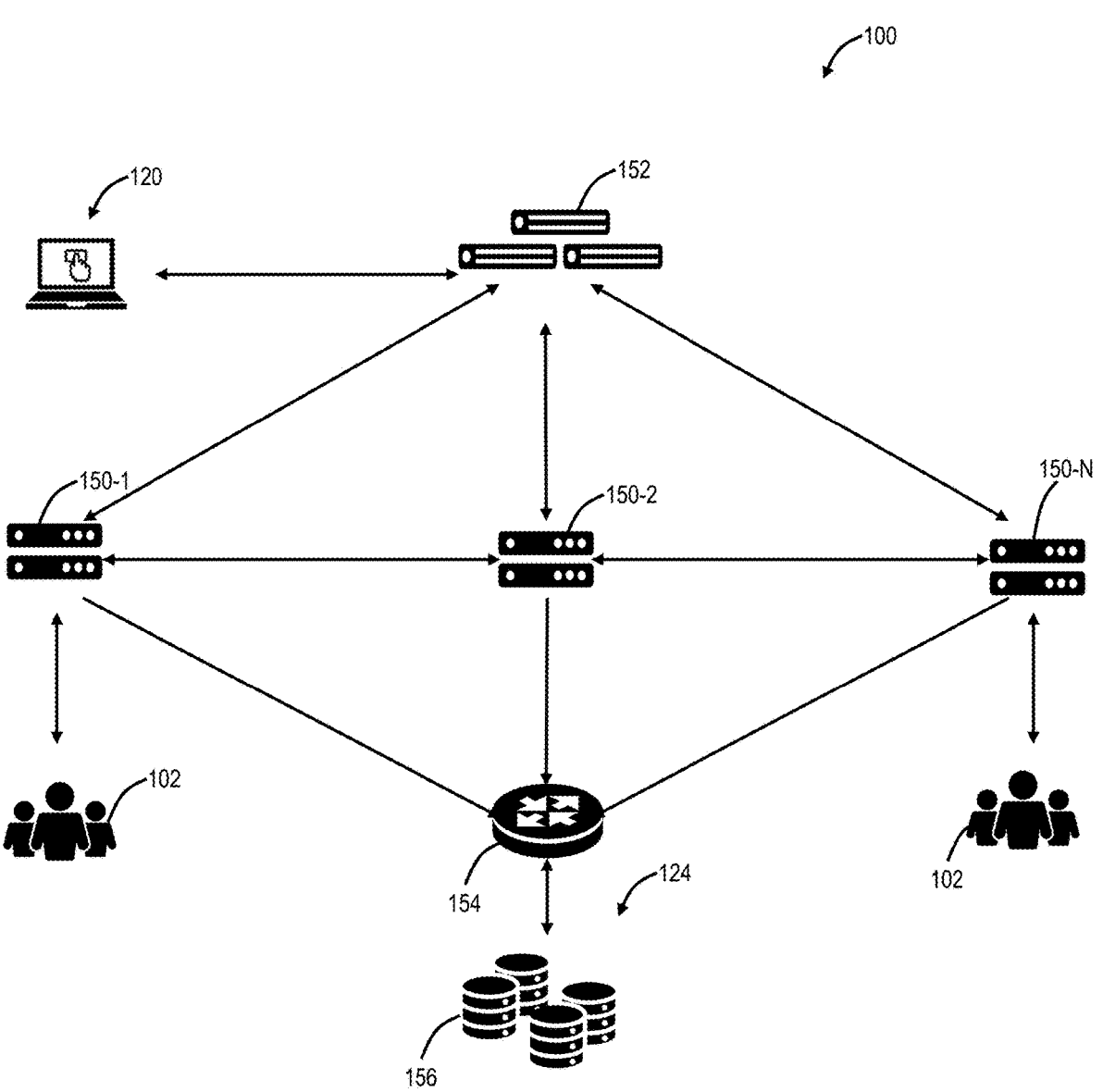
FIG. 2 is a network diagram of an example implementation of the cloud-based system.
Figure 4:
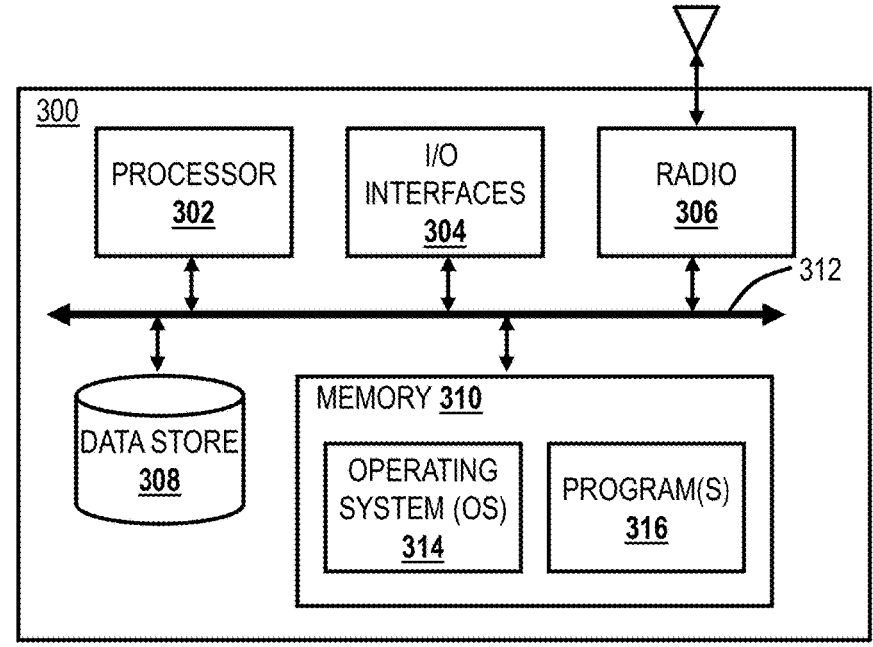

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and, optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
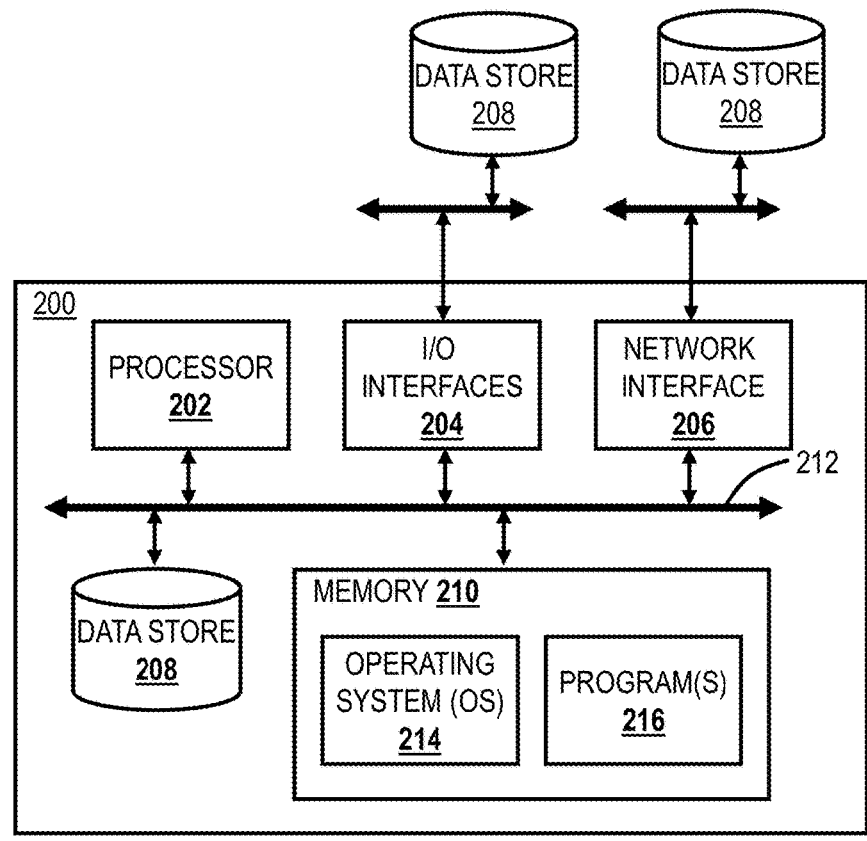
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 6:
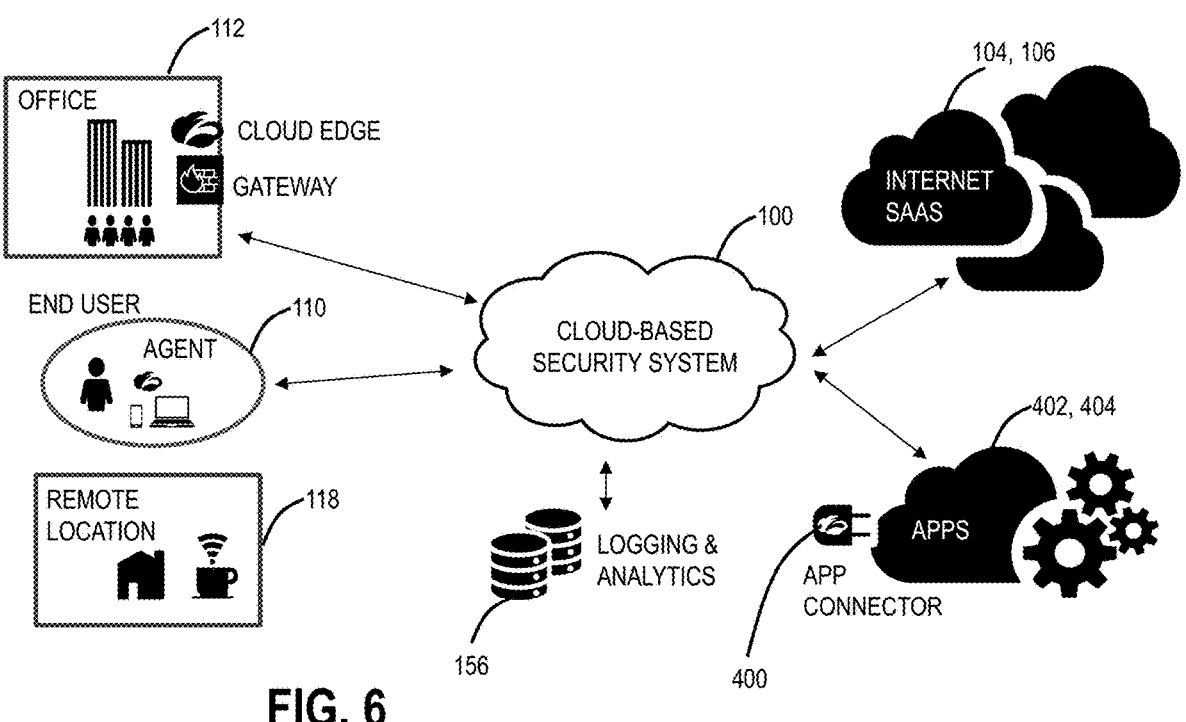
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10 G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.)

and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Sparsely Populated Log Data

In operation, the cloud-based system 100 as well as other devices, services, etc. can maintain statistics and logs. As described herein, this can be referred to as log data, and can reside in the log or database, as well as being streamed continuously. That is, the term log data can be either stored data or in-transit data. The log data represents activity by a user device 300 in the cloud-based system 100. As described herein, the term user device 300 can be any processing device that connects to the Internet 104 and/or cloud services 106, via the cloud-based system 100. Also, the user device 300 can be associated with a user 102, e.g., laptop, desktop, tablet, smart phone, etc., as well as a server or an IoT device.

As described herein, the cloud-based system 100 can maintain the log data, with records used in a backend data store for queries. A record is a collection of tens of thousands of counters. A counter can be a tuple of an identifier (ID) and value. As described herein, a counter represents some monitored data associated with the cloud-based system 100. Of note, the log data is referred to as sparsely populated, namely a large number of counters that are sparsely populated (e.g., tens of thousands of counters or more, and possible orders of magnitude or more of which are empty). For example, a record can be stored every time period (e.g., an hour or any other time interval) in the cloud-based system 100. There can be millions of active users 102 or more.

In an embodiment, the identifier can be an IP address and a location identifier. The IP address can be IP version 4 (IPv4) or IP version 6 (IPv6) and is unique for each location. The location identifier can be a string, e.g., company X HQ, San Jose Wi-Fi, etc. This combination, IP address and location identifier, can be a universally unique identifier (UUID). However, as described herein, the IP address can be assigned to a different device over time. The present disclosure addresses this issue, namely after a break in log entries and new log entries, are the prior log entries and the new log entries after the break the same device?

Examples of the sparsely populated log data can be the Nanolog system from Zscaler, Inc., the applicant. Also, descriptions of such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

§ 8.0 Example Log Entries

Figure 7:
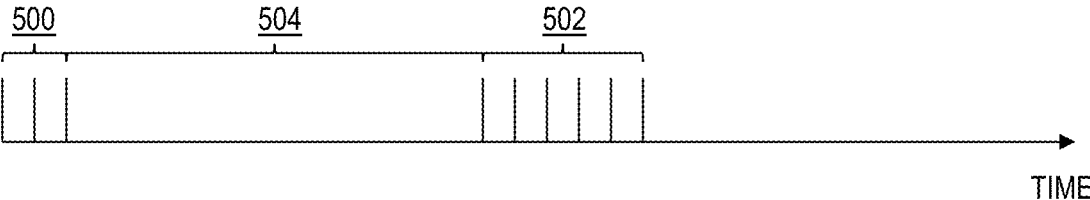
FIG. 7 is a graph of log entries for a given device based on monitoring in the cloud-based system.

FIG. 7 is a graph of log entries 500, 502 for a given device 300 based on monitoring in the cloud-based system 100. There are a first set of log entries 500, a second set of log entries 502, and a gap 504 in time where there are no log entries. For example, each entry in the first set of log entries 500 can be separated by seconds, minutes, etc. Also, each entry in the second set of log entries 502 can be separated by seconds, minutes, etc. As such, a given device 300 making the first set of log entries 500 or the second set of log entries 502 is the same device, i.e., has that IP address at that location. The gap 504 can be hours or even days. For example, a mobile device can make the first set of log entries 500 and the user 102 can leave the office and a new device can take the IP address at the location. The new device can make the second set of log entries 502. In another example, the first set of log entries 500 and the second set of log entries 502 can be made by the same device, e.g., an IoT device that naturally has gaps in its network access, leading to the gap 504.

As such, there is a question—is the device 300 that made the first set of log entries 500 the same device that made the second set of log entries 502? To that end, the present disclosure provides an approach to determine if there is a DHCP change leading to there being a different device after the gap 504.

§ 8.1 DHCP Change Detection

Figure 8:
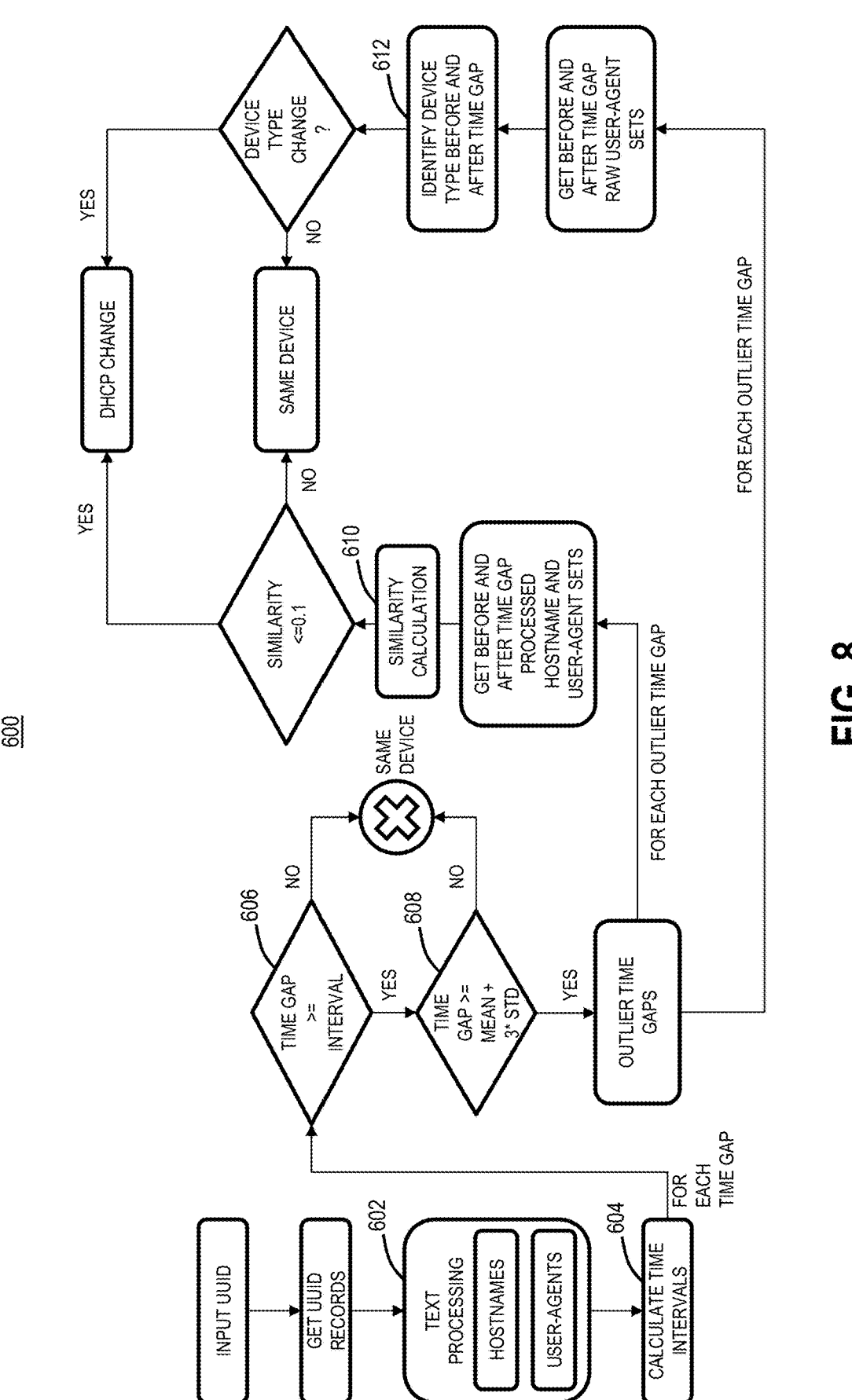
FIG. 8 is a flow diagram of a DHCP change detection process.

FIG. 8 is a flowchart of a DHCP change detection process 600. The process 600 contemplates implementation as a method having steps, via a processing device configured to implement the steps, via the cloud-based system 100 which implements the steps, and via instructions stored in a non-transitory computer-readable medium that, when executed, cause one or more processors to implement the steps.

The process includes, based on monitoring and logging network traffic data via the cloud-based system described herein, identifying one or more outlier time gaps associated with an IP address used to communicate over the network within the logged network traffic data. Based on identifying an outlier time gap associated with an IP address within the network traffic data, the systems are adapted to determine the occurrence of a DHCP change based on network traffic characteristics of the IP address before and after the outlier time gap. These network traffic characteristics are described below and include determining the similarity of hostnames and user agents before and after the outlier time gap as well as determining a device type from before and after the outlier time gap.

In general, the process 600 looks at two different characteristics, before and after the gap 504, to determine whether or not the same device is associated with the log entries 500, 502 before and after the gap 504. The two characteristics include destinations in the log entries 500, 502 and user agent information in the log entries 500, 502. If either of these two characteristics show a difference, then the process 600 declares a DHCP change, meaning the device 300 is different between the log entries 500, 502 before and after the gap 504. If both of these two characteristics do not show a difference, then it is determined that the device 300 is the same between the log entries 500, 502 before and after the gap 504.

In a first step of FIG. 8, various log entries are received each having a UUID, e.g., an IP address and location identifier. A subset of entries is obtained and text processing 602 is performed on the subset of entries. The text processing involves obtaining the hostnames (destinations) and the user agent information from the subset of entries and transforming the text present in the hostnames (destinations) and the user agents.

After performing the text processing, time gaps 504 are calculated 604 between two consecutive records. That is, for each record in the obtained entries, the systems determine the time gap 504 before and after the record. A record is contemplated as a single entry in the log data associated with an IP address.

The remaining steps in FIG. 8 are performed for each time gap 504. As described herein, the time gap 504 is a period of time over which is it not possible to say that a given IP address at a given location still belongs to the same device 300 because the device 300 has no information in a log during the time gap 504. For example, the device 300 is not communicating during the time gap 504—is this because the device 300 is idle? Or is this because the IP address at the given location was reassigned because the device 300 is off or has left the location.

In an embodiment, it was determined, based on experimentation, that a time gap 504 of interest is greater than or equal to 6 hours (significant time gap) and the time gap 504 is greater than or equal to an average time gap in the logs plus three standard deviations. Such a time gap 504 that meets these criteria is an "outlier time gap" meaning this could be a time gap 504 where there is a device change, i.e., "DHCP change." It was determined that these two aspects cover an extended period of time of no communication and an unusual extended period of time based on past activity. Of note, the outlier time gap can be based on the DHCP reservation period as well. That is, the significant time gap value (previously defined as 6 hours) can be based on the DHCP reservation period.

The systems are adapted to determine if a time gap 504 is greater than or equal to the preconfigured significant time gap value (step 606). For example, a time gap 504 less than the preconfigured "significant time gap" value (in this example 6 hours) would not be processed further, and the systems will assume no device change has happened. Responsive to a time gap 504 exceeding the significant time gap value, the systems are adapted to determine if the time gap 504 is greater than or equal to an average time gap in the logs plus three standard deviations (step 608). This average time gap can be associated with the specific network and can be different for each network on which the present steps are performed in association with. If the time gap 504 is not greater than or equal to an average time gap in the logs plus three standard deviations, the systems do not process the time gap 504 any further, and assume no device change has occurred. Alternatively, responsive to a time gap 504 being greater than or equal to an average time gap in the logs plus three standard deviations, the time gap 504 is considered an outlier time gap and is processed further. In various embodiments, the traffic can be processed further based on an anomaly detection algorithm detecting an anomaly associated with the IP addresses traffic. That is, if an anomaly is detected, the traffic can be processes to determine if a device change has occurred as described further herein.

For each outlier time gap, the process 600 includes checking the similarity of the hostnames and user agent information from the text processing (step 610). The process 600 can use a Jaccard similarity comparison. For the hostnames, the systems are looking to see if the network usage patterns have changed. For example, in the first set of log entries 500, assume the hostnames are Facebook, YouTube, and other general websites where a user 102 would visit, and, in the second set of log entries 502, there is just canon.com. This would likely indicate a change in device, e.g., from a mobile device to a printer. In various embodiments, the systems perform the comparison of hostnames and user agents for specified time intervals before and after the time gap 504. These intervals, i.e., intervals of time representing the log entries 500 and 502, can be set to a specific time interval. Additionally, the systems can be configured to process a specific number of hostnames and user agents from the first set of log entries 500 and the second set of log entries 502. For example, 50 hostnames/user agents from the first set of log entries 500 and 50 hostnames/user agents from the second set of log entries 502. These hostnames/user agents are then compared for similarity. The similarity score produced by the Jaccard similarity computation (or any other similarity comparison of the like) is then analyzed. Responsive to the score being above a threshold, for example 0.1, the systems assume the traffic from the IP address is from the same device before and after the time gap 504.

For the user agent, in HTTP, the User-Agent request header is a characteristic string that lets servers and network peers identify the application, operating system, vendor, and/or version of the requesting user agent. For example, the user agent may say "iPhone" or the like. Also, IoT devices typically do not have a user agent. The systems look for similarities or differences in the user agent as well as the hostnames.

Further, for each outlier time gap, the process 600 extracts user agent text from before and after the time gap 504. That is, the systems extract user agent text from the first set of log entries 500 and the second set of log entries 502. From the user agent text, it is possible to extract the device type. By extracting the device type from before and after the outlier time gap, the systems can determine if the device type is the same from before and after the outlier time gap (step 612). If the device type is the same from the first set of log entries 500 and the second set of log entries 502, the systems assume that no DHCP change has occurred.

In various embodiments, the systems can determine that no DHCP change has occurred based on any of the previously described processes resulting in such a determination. That is, the systems can determine that no DHCP change has occurred when the similarity score of the hostname/user agent comparison is above a threshold or the device type is determined to be the same via the user agent text. The same is contemplated for determining that a DHCP change has occurred.

In other embodiments, the systems can determine that no DHCP change has occurred when both of the previously described processes result in such a determination. That is, the systems can determine that no DHCP change has occurred when the similarity score of the hostname/user agent comparison is above a threshold and the device type is determined to be the same via the user agent text. The same can be contemplated for determining that a DHCP change has occurred, i.e., the similarity score of the hostname/user agent comparison is below a threshold and the device type is determined to not be the same via the user agent text.

Finally, the process 600 determines whether there is a DHCP change for a given outlier time gap. When there is not a DHCP change, this means the device before and after the outlier time gap is the same device and the log entries can be marked accordingly. When there is a DHCP change, the log entries can also be marked accordingly. In this manner, the logs are correctly attached to the same device within the log stores as described herein. That is, the present systems can alter logged network traffic data based on the results of the present processes. More specifically, the systems can mark entries of logged data accordingly with device markers to enrich the data.

§ 8.2 Process for DHCP Change Detection

Figure 9:
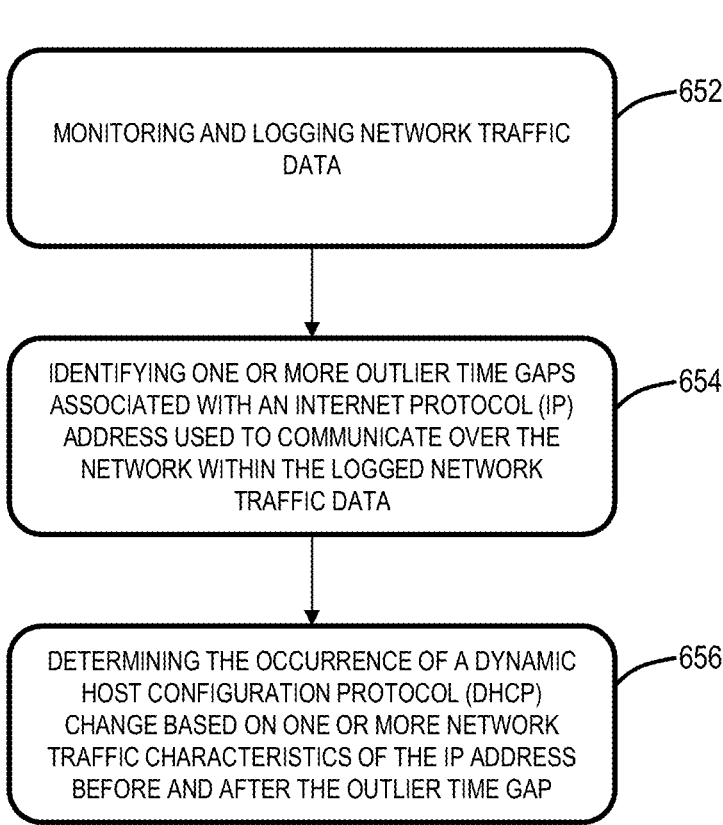
FIG. 9 is a flow chart of a process for DHCP change detection.

FIG. 9 is a flow chart of a process 650 for DHCP change detection. The process 650 includes monitoring and logging network traffic data (step 652); identifying one or more outlier time gaps associated with an Internet Protocol (IP) address used to communicate over the network within the logged network traffic data (step 654); and determining the occurrence of a Dynamic Host Configuration Protocol (DHCP) change based on one or more network traffic characteristics of the IP address before and after the outlier time gap (step 656).

The process 650 can further include wherein the one or more outlier time gaps are determined based on a time gap being greater than or equal to a significant time gap value. The one or more outlier time gaps can be determined based on a time gap being greater than or equal to an average time gap in the logged network traffic plus three standard deviations. The one or more network traffic characteristics can include a similarity of hostnames and user agents associated with the IP address from before and after the outlier time gap. The steps can further include performing a similarity calculation based on a plurality of hostnames and user agents associated with the IP address from before and after the outlier time gap. The steps can further include responsive to a similarity score of the similarity calculation being below a threshold, determining the occurrence of a DHCP change. The one or more network traffic characteristics can include a device type associated with the IP address from before and after the outlier time gap. The steps can further include extracting a device type from user agent text associated with the IP address from before and after the outlier time gap. The steps can further include responsive to identifying a device type change, determining the occurrence of a DHCP change. The steps can further include marking the network traffic data based on the determining.

§ 9.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

monitoring and logging network traffic data in a cloud-based system that maintains sparsely populated log data where many log counters are empty;

identifying one or more outlier time gaps associated with an Internet Protocol (IP) address used to communicate over the network within the logged network traffic data, the one or more outlier time gaps determined based on the time gap being greater than or equal to a preconfigured significant time gap value and greater than or equal to an average time gap in the logged network traffic plus a multiple of a standard deviation; and determining an occurrence of a Dynamic Host Configuration Protocol (DHCP) change based on one or more network traffic characteristics of the IP address before and after the outlier time gap, wherein the one or more network traffic characteristics include at least one of: (i) a similarity calculation of hostnames and user agents from before and after the outlier time gap, wherein responsive to a similarity score being below a threshold, the DHCP change is determined; and (ii) a device type extracted from user agent text before and after the outlier time gap, wherein responsive to identifying a device type change, the DHCP change is determined.

2. The method of claim 1, wherein the significant time gap value is based on a DHCP reservation period.

3. The method of claim 1, wherein the similarity calculation of hostnames and user agents comprises a Jaccard similarity comparison.

4. The method of claim 3, wherein the Jaccard similarity comparison is performed over a predetermined number of hostnames and user agents selected from log entries before and after the outlier time gap.

5. The method of claim 1, wherein the steps further comprise:

performing a similarity calculation based on a plurality of hostnames and user agents associated with the IP address from before and after the outlier time gap.

6. The method of claim 1, wherein the device type is determined by parsing operating system or hardware identifiers included in the user agent text.

7. The method of claim 1, wherein responsive to both (i) a similarity score of the similarity calculation being below a threshold and (ii) identifying a device type change, the occurrence of the DHCP change is determined.

8. The method of claim 1, wherein responsive to at least one of the similarity score being above a threshold or the device type being unchanged, the method determines that no DHCP change has occurred.

9. The method of claim 1, wherein the outlier time gap is further determined based on an anomaly detection algorithm applied to network traffic of the IP address.

10. The method of claim 1, wherein the steps further comprise:

marking the network traffic data based on the determining.

11. A non-transitory computer-readable medium comprising instructions that, when executed, cause one or more processors to perform steps of:

monitoring and logging network traffic data in a cloud-based system that maintains sparsely populated log data where many log counters are empty;

identifying one or more outlier time gaps associated with an Internet Protocol (IP) address used to communicate over the network within the logged network traffic data, the one or more outlier time gaps determined based on the time gap being greater than or equal to a preconfigured significant time gap value and greater than or equal to an average time gap in the logged network traffic plus a multiple of a standard deviation; and determining an occurrence of a Dynamic Host Configuration Protocol (DHCP) change based on one or more network traffic characteristics of the IP address before and after the outlier time gap, wherein the one or more network traffic characteristics include at least one of: (i) a similarity calculation of hostnames and user agents from before and after the outlier time gap, wherein responsive to a similarity score being below a threshold, the DHCP change is determined; and (ii) a device type extracted from user agent text before and after the outlier time gap, wherein responsive to identifying a device type change, the DHCP change is determined.

12. The non-transitory computer-readable medium of claim 11, wherein the significant time gap value is based on a DHCP reservation period.

13. The non-transitory computer-readable medium of claim 11, wherein the similarity calculation of hostnames and user agents comprises a Jaccard similarity comparison.

14. The non-transitory computer-readable medium of claim 3, wherein the Jaccard similarity comparison is performed over a predetermined number of hostnames and user agents selected from log entries before and after the outlier time gap.

15. The non-transitory computer-readable medium of claim 11, wherein the steps further comprise:

performing a similarity calculation based on a plurality of hostnames and user agents associated with the IP address from before and after the outlier time gap.

16. The non-transitory computer-readable medium of claim 11, wherein the device type is determined by parsing operating system or hardware identifiers included in the user agent text.

17. The non-transitory computer-readable medium of claim 11, wherein responsive to both (i) a similarity score of the similarity calculation being below a threshold and (ii) identifying a device type change, the occurrence of the DHCP change is determined.

18. The non-transitory computer-readable medium of claim 11, wherein responsive to at least one of the similarity score being above a threshold or the device type being unchanged, the method determines that no DHCP change has occurred.

19. The non-transitory computer-readable medium of claim 11, wherein the outlier time gap is further determined based on an anomaly detection algorithm applied to network traffic of the IP address.

20. The non-transitory computer-readable medium of claim 11, wherein the steps further comprise:

marking the network traffic data based on the determining.

* * * * *